United States Patent
Ferguson

(10) Patent No.: US 12,242,833 B2
(45) Date of Patent: Mar. 4, 2025

(54) RANDOMIZED COMPILER OPTIMIZATION SELECTION FOR IMPROVED COMPUTER SECURITY

(71) Applicant: California Institute of Technology, Pasadena, CA (US)

(72) Inventor: Michael Ian Ferguson, Pine Mountain Club, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 175 days.

(21) Appl. No.: 17/929,522

(22) Filed: Sep. 2, 2022

(65) Prior Publication Data

US 2023/0079426 A1     Mar. 16, 2023

Related U.S. Application Data

(60) Provisional application No. 63/243,877, filed on Sep. 14, 2021, provisional application No. 63/240,269, filed on Sep. 2, 2021.

(51) Int. Cl.
*G06F 8/41* (2018.01)
*G06F 11/36* (2006.01)
*G06F 11/3668* (2025.01)

(52) U.S. Cl.
CPC ............ *G06F 8/447* (2013.01); *G06F 8/4441* (2013.01); *G06F 11/3696* (2013.01)

(58) Field of Classification Search
CPC ..... G06F 8/447; G06F 8/4441; G06F 11/3696
See application file for complete search history.

(56) References Cited

U.S. PATENT DOCUMENTS

| | | | |
|---|---|---|---|
| 2006/0200796 A1* | 9/2006 | Ota ............................ | G06F 8/73 717/106 |
| 2008/0215508 A1* | 9/2008 | Hanneman ............. | G06N 3/004 706/45 |
| 2014/0149969 A1* | 5/2014 | Brower ................... | G06F 8/423 717/140 |
| 2017/0249252 A1* | 8/2017 | Elias ....................... | G06F 12/04 |

FOREIGN PATENT DOCUMENTS

DE     0806725 A2 * 11/1997 ............... G06F 8/53

OTHER PUBLICATIONS

NPL_EP 0806725 A2_PDF_Version with Paragraph Numbers (Year: 1997).*

(Continued)

*Primary Examiner* — Ziaul A Chowdhury
(74) *Attorney, Agent, or Firm* — Gates & Cooper LLP

(57) ABSTRACT

A method and system provide the ability to compile computer source code. The source code is pre-processed to generate pure source code that includes definitions required for interpretation. The pure source code is formalized in a compiler, into assembly language that is processor specific. The formalization includes determining a set of two or more optimization routines, randomly selecting a selected optimization routine from the set of two or more optimization routines, and applying the selected optimization routine to each segment of the pure source code in a serialized manner. An executable binary file is then output and executed based on the formalized pure source code.

20 Claims, 8 Drawing Sheets

(56) References Cited

OTHER PUBLICATIONS

[GNU C Compiler Internals] GNU C Compiler Internals, 13 pages, Apr. 10, 2016, https://web.archive.org/web/20160410185222/https://www.redhat.com/magazine/002dec04/features/gcc/.
Merrill, "Generic and Gimple: A New Tree Representation for Entire Functions". GCC Developers Summit 2003, pp. 171-180.
Option Summary (Using the GNU Complier Collection (GCC)). 2022, 28 pages, https://gcc.gnu.org/onlinedocs/gcc/OptionSummary.html.

* cited by examiner

RANDOMIZED COMPILER OPTIMIZATION SELECTION FOR IMPROVED COMPUTER SECURITY

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 63/240,269, filed on Sep. 2, 2021, with inventor(s) Michael I. Ferguson, entitled "Randomized Compiler Optimization Selection for Improved Computer Security"; and Provisional Application Ser. No. 63/243,877, filed on Sep. 14, 2021, with inventor(s) Michael Ian Ferguson, entitled "Specified Compiler Optimization Selection for Improved Computer Security".

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

The present invention relates generally to computer compilers, and in particular, to a method, apparatus, system, and article of manufacture for randomizing optimization routines for software compilers.

2. Description of the Related Art

Referring to FIG. 1, software compilers 102 convert source code 104 in a human readable language 106 (e.g., C, C++, FORTRAN, and others) to assembly language. The compilers 102 are an element of the conversion from source code 104 to binary/executable code 108 (aka machine code/ machine readable code 110) that runs (i.e., is executable) on a specific design of an electronic processor as shown in FIG. 1. In this regard, FIG. 1 illustrates the generic compilation process of the prior art.

FIG. 2 illustrates the detailed flow for the generic compilation process of the prior art. Generally, the tools used in this procedure are a pre-processor 202, a compiler 204, and an assembler 206. The pre-processor 202 uses keywords in the source code 208 to specify additional files, inputs, and directives 210 that automate the process of including library headers, pre-defined numbers, such as arithmetic constants and memory addresses (i.e., the pre-processor 202 identifies the full source tree and processes directives). The output of a pre-processor 202 is "pure" source code 212 (i.e., all code in one source language and one file), with all definitions required for interpretation of the source code 208. Compilers 204 take the output 212 of the pre-processor 202 and formalize it into Assembly Language 214, which is specific to a particular hardware architecture, with specific references to memory registers and the limited set of instructions that can be interpreted by the processor to route data for the process of computation. The output 214 of the compiler 204 is then sent to an Assembler 206, which produces a binary (formatted) code 216 that can be stored directly in the hardware and represent the functional instructions of a computer program (and which may be specific to the processor architecture). The output 216 from the Assembler 206 is provided to the Linker 218 that takes the binary formatted object files 216 and combines them into one binary formatted executable 222 that consists of a binary formatted file 220 that is specific to a processor architecture with hard links to libraries.

The purpose of a compiler 204 is to simplify the process of creating the assembly language itself, as creating assembly language "by hand" without the aid of a compiler 204 is labor intensive and would lead to mistakes resulting in software defects for even small programs. In the history of computing, assembly language was created before programming languages, and the programs were small enough that they could be written by a small team of engineers with the aid of book-keeping techniques for manually tracking where objects were stored in memory, and for later retrieval. The first programming language was created in 1951, but the first widely used language was introduced in the mid 1950s and was called FORmula TRANslator (aka FORTRAN, marketed by IBM™). Compilers 204 were created at the same time to transcribe the use of variables in an algorithm to memory addresses used by the computer. At the time, memory and processor time were precious commodities. Optimizations for both were implemented in the algorithms and have been the subject of intense study in computer science departments ever since.

In view of the above, while prior art systems have continuously attempted to optimize the performance of compilers 204, such systems can always be further optimized and the selection and use of optimization algorithms have been limited. Thus, embodiments of the invention provide modifications that optimize existing algorithms within a compiler 204 and provide new specifications for pre-processor directives.

SUMMARY OF THE INVENTION

Embodiments of the invention have identified an issue/ recognized an observation with respect to prior art compiler optimization algorithms. More specifically, memory and CPU time are no longer the driving concern for the organizations that specify and pay for the development of computer code. Instead, the driving concern for many industry and government organizations now is the difficulty faced for hackers to subvert software defects to circumvent security restrictions and allow for unauthorized access within a computing environment. Based on such an observation, embodiments of the invention have modified the optimization procedure within the compiler, in which the decision made in the optimization routine is randomized among similarly capable implementations of the code.

Accordingly, embodiments of the invention modify the overall process of compilation, which converts human readable text in a programming language, to assembly language that is processor specific.

BRIEF DESCRIPTION OF THE DRAWINGS

Referring now to the drawings in which like reference numbers represent corresponding parts throughout.

DETAILED DESCRIPTION OF THE INVENTION

Figure 1:
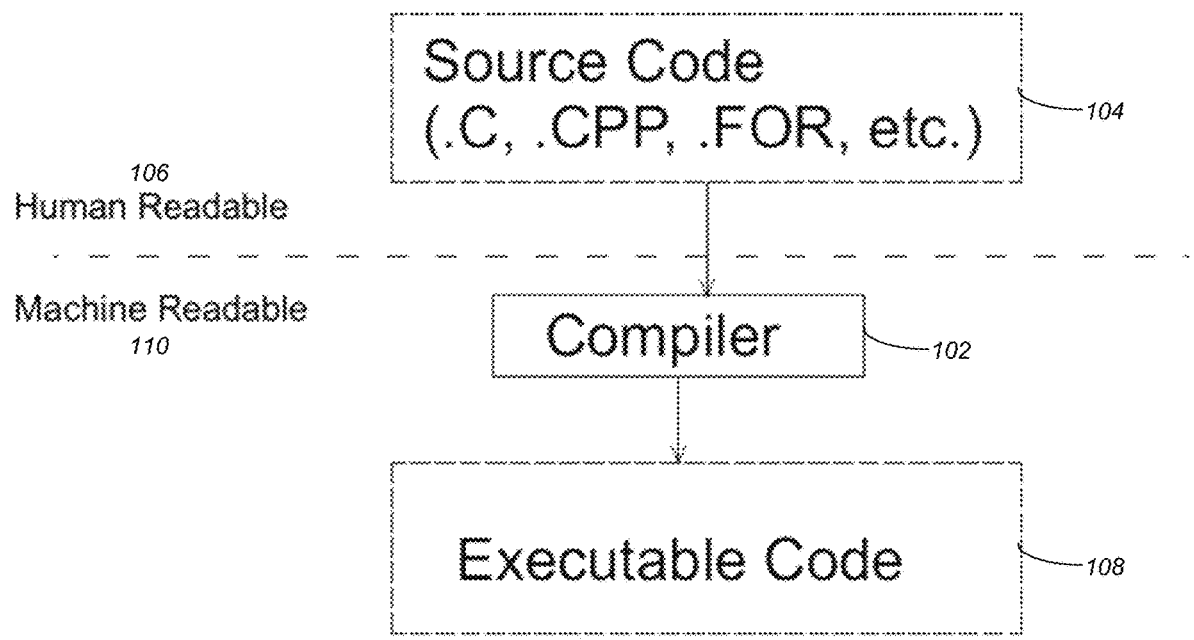
FIG. 1 illustrates the generic compilation process of the prior art.
Figure 2:
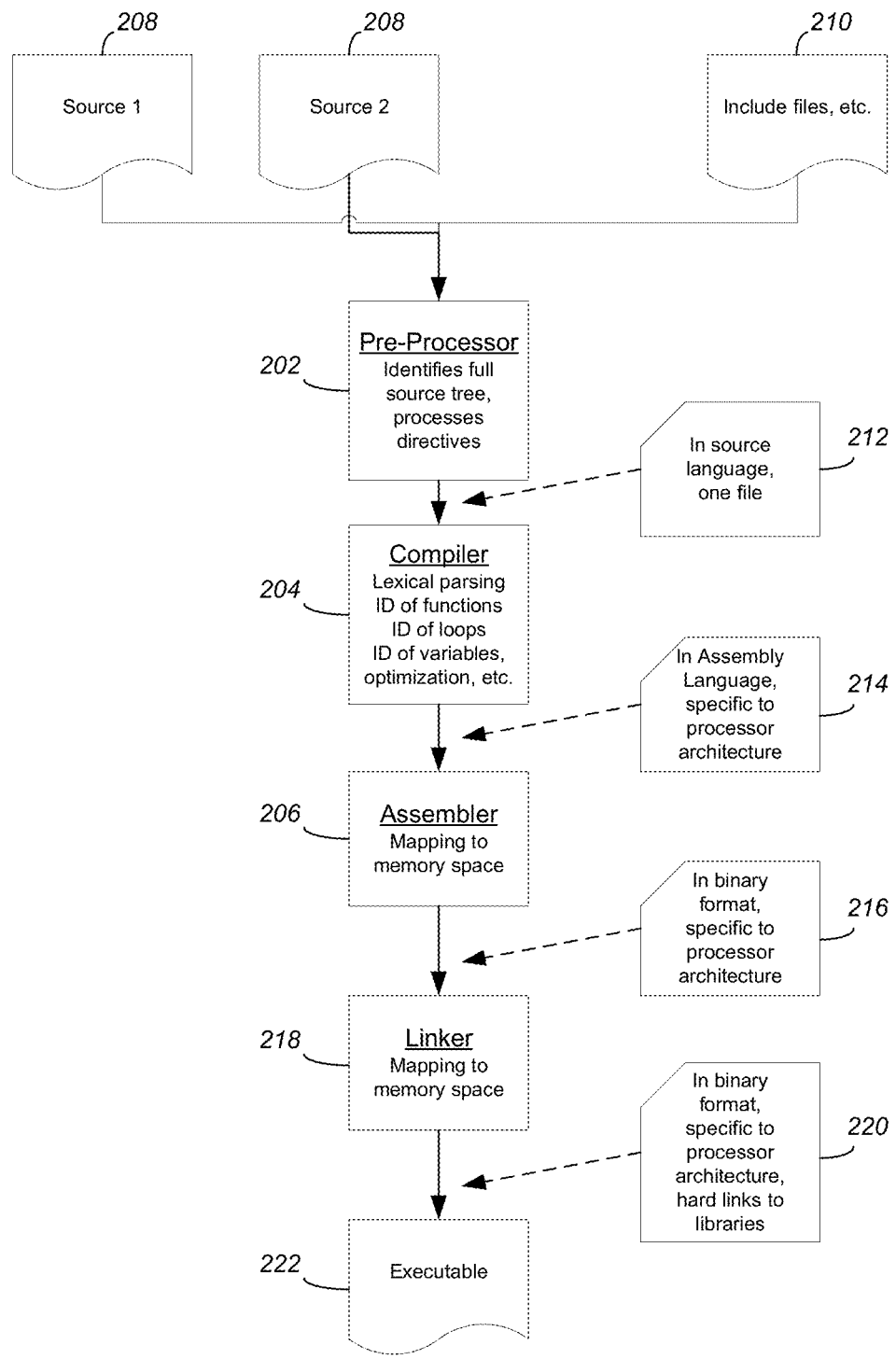
FIG. 2 illustrates the detailed flow for the generic compilation process of the prior art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Randomized Compiler Optimization Selection

Overview

Embodiments of the invention modify the optimization procedure within the compiler, in which the decision made in the optimization routine is randomized among similarly capable implementations of the code. Optimization is done within the compiler in many forms, such as inline expansion, dead code elimination, constant propagation, loop transformation, and automatic parallelization, among others. The scope of the optimizations can be within a single code fragment (procedure called by other code fragments) or could span procedures and could duplicate procedures, with different implementations for each instance, depending on the overall "cost." "Cost" in this sense means processor cycles, memory usage, time taken to access memory, or some complex combination of these metrics or other metrics. It is not intended to imply monetary cost. Further, embodiments of the invention modify the optimization algorithm to ignore the difference between intermediate solutions of similar cost.

DETAILED DESCRIPTION

As described above, embodiments of the invention modify existing algorithms used by software compilers. More specifically, the optimization procedure within a compiler is modified by randomizing one or more decisions within an optimization routine—i.e., by ignoring the differences between intermediate compilation solution. The result of such modifications provides a more secure software system by making it more difficult for hackers using "out of the box" scripts to subvert software versions that have known (likely published) defects.

The following example illustrates an optimization using C as a programming language. Exemplary input code may consist of the following:

```
int main ( )
{
```

```
int total = 0;
    for (int i=1; i<10; i++)
    {
    total += i;
    }
}
```

The relevant section of the resulting Assembly Language is illustrated in Code A with the bolded code identifying the code to be optimized.

| CODE A - Assembly Code | | | |
|---|---|---|---|
| 1 | main: | | |
| 2 | | pushq%rbp | |
| 3 | | .seh_pu | %rbp |
| 4 | | movq | %rsp, %rbp |
| 5 | | .seh_se | %rbp, 0 |
| 6 | | subq | $48, %rsp |
| 7 | | .seh_st | 48 |
| 8 | | .seh_endprologue | |
| 9 | | call | __main |
| 10 | | movl | $0, -4 (%rbp) |
| 11 | | movl | $1, -8(%rbp) |
| 12 | | jmp | .L2 |
| 13 | .L3: | | |
| 14 | | movl | -8(%rbp), %eax |
| 15 | | addl | %eax, -4(%rbp) |
| 16 | | addl | $1, -8(%rbp) |
| 17 | .L2: | | |
| 18 | | cmpl | $9, -8(%rbp) |
| 19 | | jle | .L3 |
| 20 | | movl | $0, %eax |
| 21 | | addq | $48, %rsp |
| 22 | | popq | %rbp |
| 23 | | ret | |
| 24 | | .seh_endproc | |
| 25 | | .ident "GCC: (GNU) 10.2.0" | |

For optimization, this example code fragment could be implemented by unrolling the for-loop implemented by the code section identified as ".L3" in the above assembly code. The resulting assembly code would be illustrated in CODE B.

| CODE B- Assembly Code with Unrolled For Loop | | | |
|---|---|---|---|
| 1 | main: | | |
| 2 | | pushq%rbp | |
| 3 | | .seh_pu | %rbp |
| 4 | | movq | %rsp, %rbp |
| 5 | | .seh_se | %rbp, 0 |
| 6 | | subq | $48, %rsp |
| 7 | | .seh st | 48 |
| 8 | | .seh_endprologue | |
| 9 | | call | __main |
| 10 | | movl | $0, -4 (%rbp) |
| 11 | | addl | $1, -4(%rbp) |
| 12 | | addl | $2, -4(%rbp) |
| 13 | | addl | $3, -4(%rbp) |
| 14 | | addl | $4, -4(%rbp) |
| 15 | | addl | $5, -4(%rbp) |
| 16 | | addl | $6, -4(%rbp) |
| 17 | | addl | $7, -4(%rbp) |
| 18 | | addl | $8, -4(%rbp) |
| 19 | | addl | $9, -4(%rbp) |
| 20 | | movl | $0, %eax |
| 21 | | addq | $48, %rsp |
| 22 | | popq | %rbp |
| 23 | | ret | |
| 24 | | .seh_endproc | |
| 25 | | .ident "GCC: (GNU) 10.2.0" | |

Code B is functionally equivalent to Code A, but the memory utilization is different because the section of the program dedicated to instructions, aka the TEXT section, is different. It so happens in this example that the code takes the same number of memory blocks to store it, but if the source code were to end at line 19 as opposed to 9, it is obvious that Code B would take more memory to store the TEXT section of the program. This is a trivial example of an optimization that is done based on a calculation of cost in the compiler many hundreds, if not thousands of times during compilation. In this example, the only change was due to a static implementation of the arithmetic constants (1 . . . 9). This example also only used local registers for memory storage, not the main memory.

Figure 3:
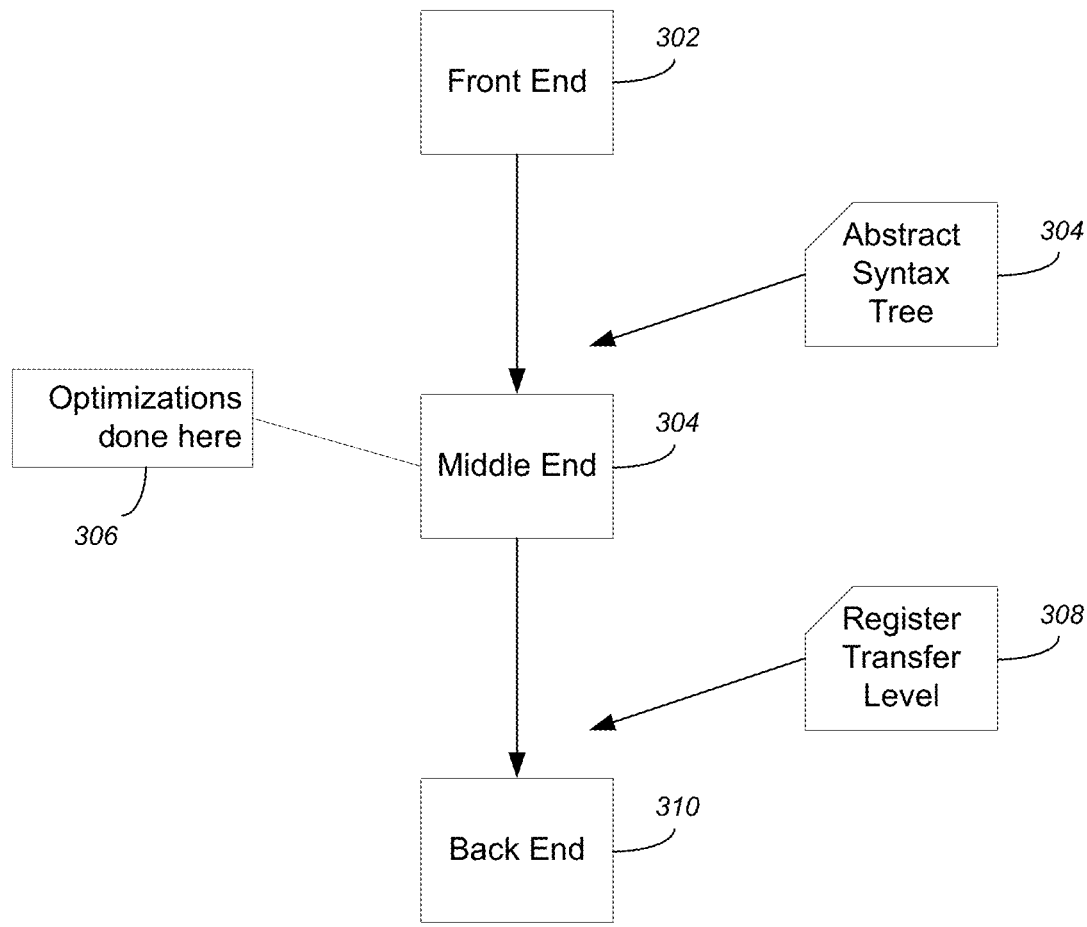
FIG. 3 illustrates typical compiler structures that may be utilized in accordance with one or more embodiments of the invention.

A second exemplary code optimization includes inline expansion. In the fragment Code A above, a functional block labeled L3 is called via a jump instruction. If the TEXT of the routine L3 were included in each instance where it was called, the memory allocation (layout of the TEXT section) would look different as well. Optimizations such as the ones shown above are generally applied in the middle-end and back-end of compilers. In this regard, FIG. 3 illustrates typical compiler structures that may be utilized in accordance with one or more embodiments of the invention. As illustrated, the front end 302 translates a computer programming source code into an intermediate representation (e.g., an abstract syntax tree 304) the middle end 304 performs optimizations 306 (e.g., to generate the intermediate representation at register transfer level 308 of the hardware architecture), and the backend 310 works with the intermediate representation to produce code in a computer output language. The backend 310 usually optimizes to produce code that runs faster.

Figure 4:
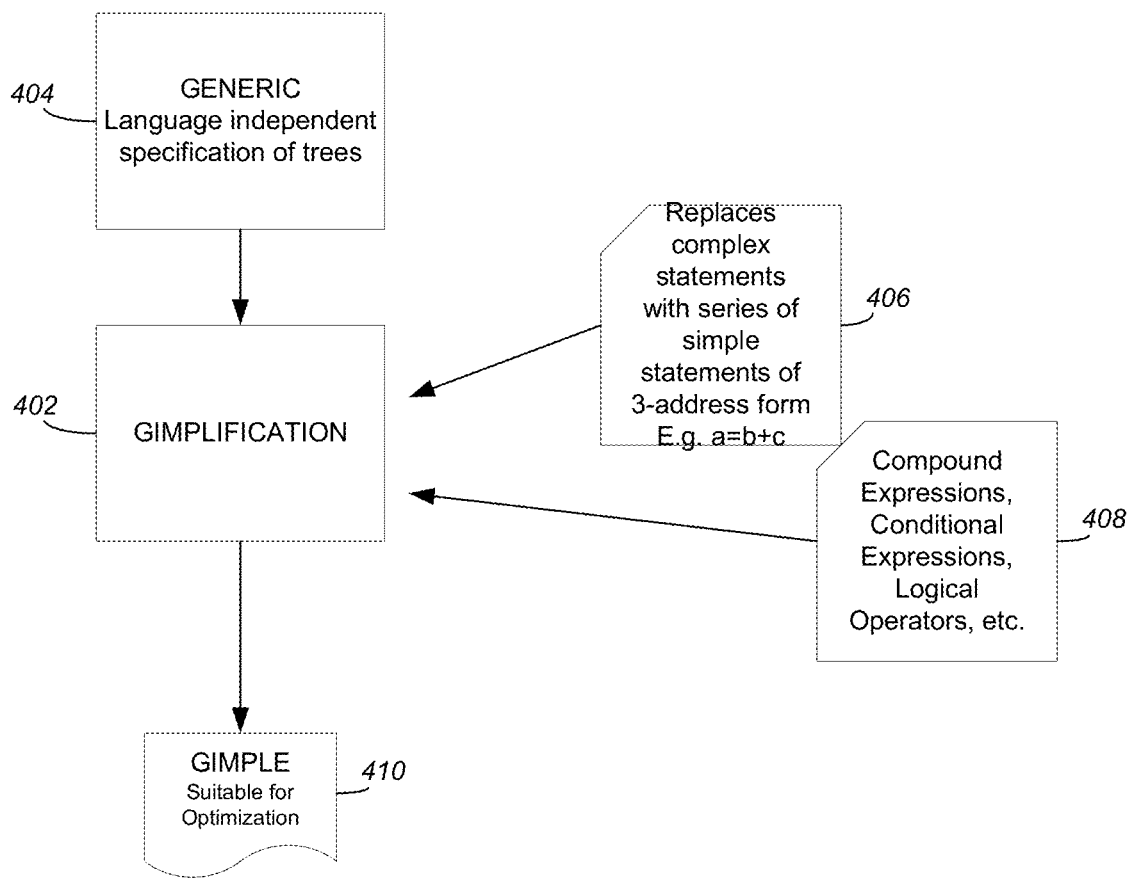
FIG. 4 illustrates a Gnu Compiler Collection (GCC) example of structuring for one set of optimizations in accordance with one or more embodiments of the invention.

A brief look at the Gnu Compiler Collection (aka and well known as GCC) indicates a list of over 200 options for optimization [GCC Optimization Summary]. The optimizations are performed on intermediate structures created by the compiler and written in several forms and optimized in different places. FIG. 4 illustrates a Gnu Compiler Collection (GCC) example of structuring for one set of optimizations in accordance with one or more embodiments of the invention. More specifically, FIG. 4 gives an example of the internal structure of a GCC in which the data manipulations are broken down to 3-address structures to perform functions, assignments, or swaps of memory, a process called Gimplification, to this common structural abstraction [Generic and Gimple]. As illustrated, Gimplification 402 takes the data in a generic structure 404 (e.g., a language independent specification of trees) and gimplifies (e.g., breaks down/translates) the code using various processes 406-408 (e.g., replacing complex statements with a series of simple statements of 3-address form [e.g., a=b+c] at 406 and generates compound expressions, conditional expressions, logical operators, etc. at 408) to produce Gimple 410 (or code in the abstract Gimple language)) that is suitable for optimization.

Once the programs are in this abstraction, all semblance to their source language are gone, and this is treated as a series of trees of arithmetic functions. These tree structures are one place in which optimizations are performed. Other simplifications/optimizations are done on the Register-Transfer Level 308 in the back-end 310.

Figure 5:
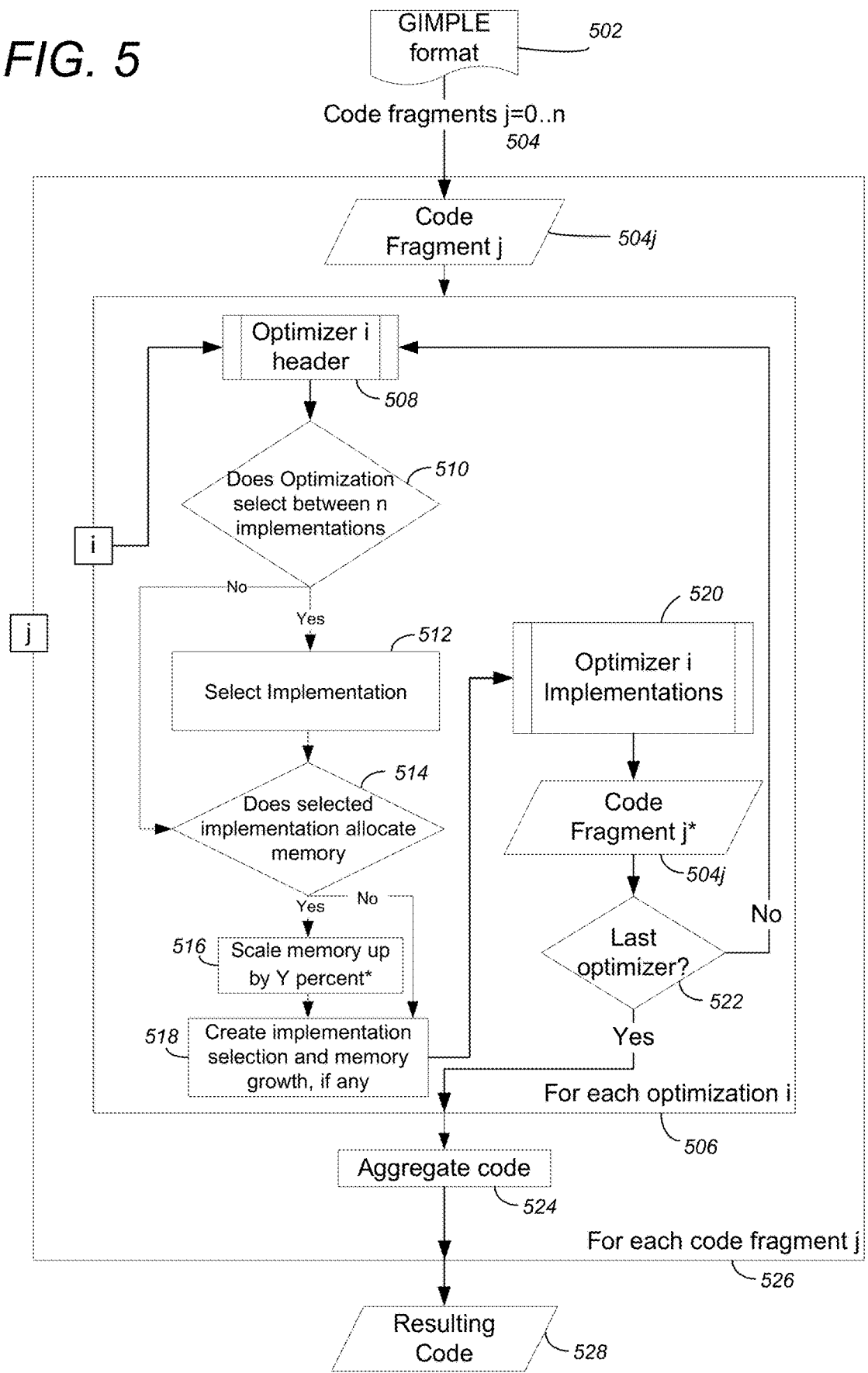
FIG. 5 illustrates the multiple optimizations and memory allocations performed in compilers in accordance with one or more embodiments of the invention.

Embodiments of the invention provide a process for modifying these algorithms to include an element of randomness for functional decomposition, memory allocation, and mapping. FIG. 5 illustrates the multiple optimizations and memory allocations performed in compilers in accordance with one or more embodiments of the invention. As illustrated, the set of code fragments j=0 . . . n 504 are in Gimple format 502 (i.e., after the processing described in FIG. 4). Each code fragment 504$j$ (in the set of code fragments 504) are sent to a series of optimization routines, which work on the set of segments 504 in a serialized fashion (i.e., one optimization at a time until all optimizations are complete). As illustrated by box 506, the series of optimization routines are performed for each optimization i.

The process begins by examining the optimizer i header at 508. A determination is made at step 510 regarding whether the optimization selects between multiple n implementations. If there are multiple implementations to select from, an implementation is selected at step 512. Such a selection may be performed in a variety of different ways. In one or more embodiments, a random selection may be forced if the cost is within a predefined threshold range/percentage. In other words, some of the optimization implementations may not have a cost function determined and thus there may not be a selection process to alter. In this instance and/or in alternative embodiments, a binary randomization, such as selecting a random number and determining if it is odd or even can be added to determine whether the optimization is performed nor not. Other optimizations do have a cost function, and when those costs are within X percentage of each other, where X is a parameter of the optimization, a random selection may be forced. In other words, if the cost function determines that multiple different optimization implementations have similar costs, a random selection of a particular optimization algorithm may be conducted. The implementation of this randomness could be done in several manners. One option is to add a random variance to all the costs, which could drive the selection to an answer not calculated on lowest cost.

In view of the above, in one or more embodiments of the invention, optimizations may be applied in a static sense rather than base don a "cost" function. For instance, if the optimization level that supports loop_unrolling is set by the user at the beginning of compilation, then it will runroll all loops that can be unrolled, or rather it is a complex set of rules that it follows. Such an unrolling may be dependent on whether some dependencies would be disrupted by unrolling the loop, and if not, it unrolls them.

Once the random selection has been completed at step 512 or if no cost function/selection process is needed, the process continues at step 514 where a determination is made regarding whether the implementation allocates memory. If the selected implementation allocates memory, the memory allocation may be scaled up by a pre-defined amount at step 516. In this regard, in some optimizations, there are memory allocations made to allow for speculative execution in a multi-threaded environment, and those memory allocations can be randomly selected to have an additional Y percentage of additional memory. Logically, this will have no effect on the results, though some computer programs are taking inputs from the real-world and will produce varying results. However, if the selected optimization does not allocate memory, the process moves to step 518. At step 518, the implementation selection and additional memory (if any) are created in order for the optimization to be performed.

The optimizer i implementations 520 that have been created at step 518 are then performed on the code fragment 504$j$. If there are additional optimizations that have not yet been performed on the current code fragment j 504$j$ being processed, the optimization continues at step 508 until all optimizations have been performed. However, once all optimizations have been processed on the code fragment j 504$j$, the code is aggregated at step 524 and the process repeats for each code fragment (as indicated by box 526). Once all code fragments have been optimized, the resulting code is output at 528.

Of note is that additional locations for random optimization is in the process of multi-processor shared memory computers. In a shared memory computer, there are multiple processors that can read from a memory cache, which logically access many orders of magnitude faster than bringing memory from the main memory banks. If two processors A and B both need the same piece of data, but at different times, processor A (or B) could request the data from main memory and it is subsequently available in the cache. Processor A (then reads the data and performs an operation. The data brought to the cache is still valid from A's perspective. It may also happen that the data is still valid in the cache (processor A did not invalidate the cache location) at the time that B needs it. With the desired valid data already in the cache, B can perform its execution with the data in a much faster manner because from B's perspective it was pre-cached. To add an element of randomness, cache lines can be arbitrarily invalidated by issuing a Cache Flush command to the processor, such as the i386 instruction CLFLUSH, for example.

The output resulting code 528 of this modified algorithm is a binary file that is logically identical to all over compiled instances, but which has an altered flow through the logic, and a different memory map, and with different array sizes and locations in logical memory. A side-effect output is the random string used when the program was compiled, which can be used for debugging (see below) or for license generation (see below).

Pre-Processor Directive

An obvious drawback to randomly changing memory structures, even if it could be guaranteed that the memory structure modification was implemented in a manner that was defect free is that the process of debugging to identify other defects in the software is made more difficult. This is because in those instances where the data is being written improperly (such as array-bounds overwrite, improper pointer arithmetic, etc.), the errors will be very difficult to track down. To assist with this, embodiments of the invention define a pre-processor directive that directs code blocks to be written into a different memory block. The pre-processor directive coupled with a command-line switch to use the previous randomness string will assure that the developer can create a bit-for-bit identical program for testing, with the additional testing code written into different memory locations.

Advantages/Benefits

The expected use-case for embodiments of the invention is in locations for which a bad-actor (cyber adversary) can gain access to the utility of a program without getting access to the binary itself, such as server-side scripts for network utilities, configuration programs for firewalls, and user interfaces. In addition, this is an anti-piracy utility for creating fingerprinted copies of binaries, so that if a modified version of the binary shows up, it can be traced back to a license that ties to the randomness string generated during compilation.

Specified Compiler Optimization Selection

In addition to the randomized selection as described above, embodiments of the invention include the ability to specify optimization utilization in existing software compilation environments to improve computer program security. In particular, embodiments of the invention provide specific implementations of optimization selection as a method of water-marking software. This watermarking will enable software providers to preserve licensing protections in the face of rampant computer software intellectual property theft. In yet another embodiment, such watermarking can be used as a method of communication between separate components of a computer system or a collection of computer systems.

Overview

When software is compiled in all digital systems, a multi-layer computer algorithm is used to decompose source code into source-independent segments of arithmetic trees. These arithmetic trees can be simplified using many methods available in the open literature, and some methods that are not published, but ultimately serve the purpose of optimizing some feature or set of features of the resulting code. Some of these features could be the size of the resulting binary file, the speed at which the binary will operate on a specific architecture, the fault-tolerance, delay-tolerance, disruption-tolerance, security against side-channel attacks (monitoring of the radiated electric fields from a processor that provides insight into the values being operated on), and other such techniques. Currently, optimizations are selected at compile time, and may be generally applied 'all at once', or individually. There are many such optimization techniques deployed in any compiler. The intended effect of the various compiler options may be to change the operational characteristics of the binary code, but a more direct and identifiable difference between the output of optimization is the memory layout of the binary program. In the canonical compiler system, the same source code will always produce the same memory layout if given the same set of resources and architecture.

As described above, embodiments of the invention provide for the random and/or selective application of the optimization algorithms on each instance of an application during the compilation process.

As an example of an optimization, one may consider the for-next statement (aka for-loop), which is a segment of code that is iterative and processes a sequence of statements for a specific number of instances, or until some condition is met. Often this is used because the algorithm is cyclic, or it is easier for programmers to write the code and have fewer software defects. However, the testing and incrementing of variables in the code adds instructions that must take up processor cycles. One method of optimizing the processor time is to expand out (or un-roll) the iterative steps into sequential commands, thus removing the testing and incrementing of otherwise static variables. Another optimization is to perform function-inlining. That is, to take a function that is written as a separate segment of code, and re-write the calling segment of code to include the called segment of code, thus removing the steps of calculating memory addresses and copying data to new locations, and copying in the called segment into the current stack or cache. In a large code-base, there will be many such loops and function calls along with other optimizations that may be selected.

Further to the above described optimizations, embodiments of the invention may specify via a binary code, the on/off behavior of individual optimization calls as they occur in the compiler. For example, in the following compiler source code from the Gnu Compiler Collection (GCC), a variable (i.e., boolean "changed") may be checked to see what type of unrolling is to be done.

```
/* Unroll LOOPS. */
void
```

```
unroll_loops (int flags)
{
  bool changed = false;
  /* Now decide rest of unrolling. */
  decide_unrolling (flags);
  /* Scan the loops, inner ones first. */
  for (auto loop : loops_list (cfun, LI_FROM_INNERMOST))
  {
    /* And perform the appropriate transformation. */
    switch (loop->lpt_decision.decision)
  }
  case LPT_UNROLL_CONSTANT:
    unroll_loop_constant_iterations (loop);
    changed = true;
    break;
  case LPT_UNROLL_RUNTIME:
    unroll_loop_runtime_interations (loop);
    changed = true;
    break;
  case LPT_UNROLL_STUPID:
    unroll_loop_stupid (loop);
    changed = true;
    break;
  case LPT_NONE:
    break;
  default:
    gcc_unreachable ( );
}
```

This code can be modified to reflect the change bolded below along with some ancillary syntax changes. The bolded text reflects the checking of a global variable called global-watermark, and getting the next binary bit (0 or 1) from that watermark to determine if the loop-unrolling routine is actually going to perform any work.

```
/* Scan the loops, inner ones first. */
printf("running unroll loops \n");
for (auto loop : loops_list (cfun, LI_FROM_INNERMOST))
{
  if(get_next_binary(global-watermark) == 1) {
  /* And perform the appropriate transformations. */
  switch (loop->lpt_decision.decision)
  {
  case LPT_UNROLL_CONSTANT:
    unroll_loop_constant_ iterations (loop);
    changed = true;
    break;
  case LPT_UNROLL_RUNTIME:
    unroll_loop_runtime_iterations (loop);
    changed = true;
    break;
  case LPT_UNROLL_STUPID:
    unroll_loop_stupid(loop);
    changed = true;
    break;
  case LPT_NONE:
    break;
  default:
    gcc_unreachable( );
}
}
```

The result of this local decision to unroll the loop will always produce the same binary code, which has the same memory map regardless of when it is compiled, given everything else being equal. In other words, there is no stochastic element to the compilation process. Similarly, for inlining functions, embodiments of the invention may utilize a statement within the GCC source file ipa-inline.c such as:

inline_small_functions ( );

Such code can be modified to show the same call to the global-watermark variable as above.

```
if(get_next_binary(global-watermark) ==1) {
  inline_small_functions ( ):
}
```

In the above case, the global variable is used to determine whether or not small functions (as defined by the GCC developers) are inlined. Any decision internal to the inline_small_functions function is unaffected by the determination at the level of the calling function, because that behavior is simply turned off. For finer control, the inline_small_functions function can be modified itself as in the following code snippets:

```
FOR_EACH_DEFINED_FUNCTION (node)
  if (!node->inlined_to)
  {
    if (!node->alias && node->analyzed
      && (node->has_gimple_body_p ( ) | | node->thunk)
      && opt_for_fn (node->decl, optimize))
```

In the above code, the developers have written a pre-compiler macro entitled FOR_EACH_DEFINED_FUNCTION (node) that will expand out to a for-loop that then examines each function in the program being compiled. That code can again be modified to examine the global-watermark variable to extract the next binary bit and make a determination if an attempt is made to do an inline optimization on this function:

```
FOR_EACH_DEFINED_FUNCTION (node)
  if (!node->inlined_to)
  {
    if (get_next_binary(global-watermark) | ==1 {
      if (!node->alias && node->analyzed
        && (node->has_gimple_body_p ( ) | | node->thunk)
        && opt_for_fn (node->decl, optimize))
```

The examples written above show two ways in which a watermark can be used to influence the compilation process by way of selecting the optimization algorithms at the local level.

One of the utilities of this watermark is to provide information to a hypervisor (runs independent of the resulting binary code) as to a specific modification of the program's operational parameters, such as the over-use or under-use of a particular type of optimization within a given program. This allows a person or entity on one side of a system to communicate to another person/entity through manipulation of the application of optimizations. The watermark recovery process is implemented to enable this. In the watermark recovery process, a hypervisor can observe when a program is calling the same piece of memory at a frequency that is suboptimal for a given architecture, and does not map to the proper application of the optimization techniques. This could be, for example, unrolling a loop that has a large number of iterations. In such a case, the application of the compiler optimization for loop-unrolling would choose not to unroll, whereas embodiments of the invention can force the application of unrolling to an arbitrarily large number. This is a subtle communication pathway that is enabled through the watermark application and watermark recovery techniques.

Logical Flow

Figure 6:
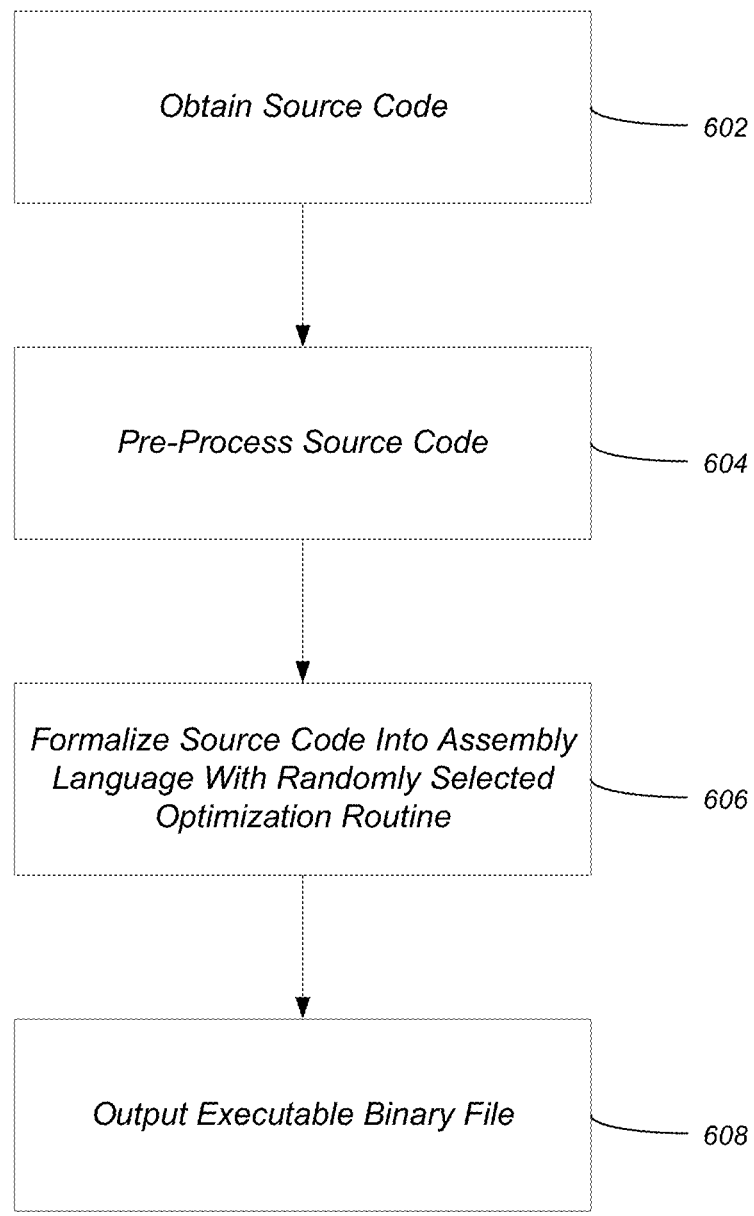
FIG. 6 illustrates the overall logical flow for such code fragment optimization in accordance with one or more embodiments of the invention.

As described above, embodiments of the invention provide a novel technique for optimizing code fragments and using a watermarking global variable in a compiler. FIG. 6 illustrates the overall logical flow for such code fragment optimization in accordance with one or more embodiments of the invention.

At step 602, source code is obtained.

At step 604, the source code is pre-processed to generate pure source code. The pure source code consists of definitions required for interpretation of the source code.

At step 606, the pure source code is formalized, in a compiler, into assembly language that is processor specific. The formalizing consists of: (i) determining a set of two or more optimization routines; (ii) randomly selecting a selected optimization routine from the set of two or more optimization routines; and (iii) applying the selected optimization routine to each segment of the pure source code in a serialized manner. In one or more embodiments of the invention, the random selection consists of: (a) determining a cost for each of the two or more optimization routines in the set; (b) determining a subset of two or more optimization routines from the set of the two or more optimization routines, wherein the subset comprises optimization routines whose costs are within a predefined threshold; and (c) randomly selecting the selected optimization routine from the subset (e.g., based on a variance of all of the costs).

The formalizing step 606 may further include determining that the selected optimization routine allocates memory, scaling up the memory allocation by a predefined percentage, and creating an implementation for the selected optimization routine with the scaled up memory allocation. In one or more embodiments, the formalizing may also include a determination that the compiling is performed in a multi-processor shared-memory computer wherein multiple processors share a memory cache, followed by an arbitrary invalidation of cache lines in the memory cache.

In one or more embodiments, the pre-processing 604 may also include defining a pre-processor directive that directs different code blocks of the pure source code to be written into different memory blocks. Thereafter, the compiling/formalizing step 606 may include debugging the source code based on the different memory blocks.

In one or more embodiments, the formalizing and optimization selection may be used as a method of watermarking software. In such embodiments, binary code may be used to specify an on/off behavior of each of the two or more optimization routines. Such binary code may be set forth in a global variable with each bit of the global variable corresponding to one of the optimization routines. In addition, this global variable may be provided to a hypervisor who may modify, via the global variable, an operational parameter of the computer code. More specifically, the hypervisor may observe when the computer code is calling a same piece of memory at a frequency that is suboptimal for a given architecture and does not map to a proper application of the two or more optimization routines. Based on such an observation, the hypervisor can modify the global variable resulting in a different application of the two or more optimization routines.

At step 608, an executable binary file is output and/or executed based on the formalized pure source code.

Hardware Environment

Figure 7:
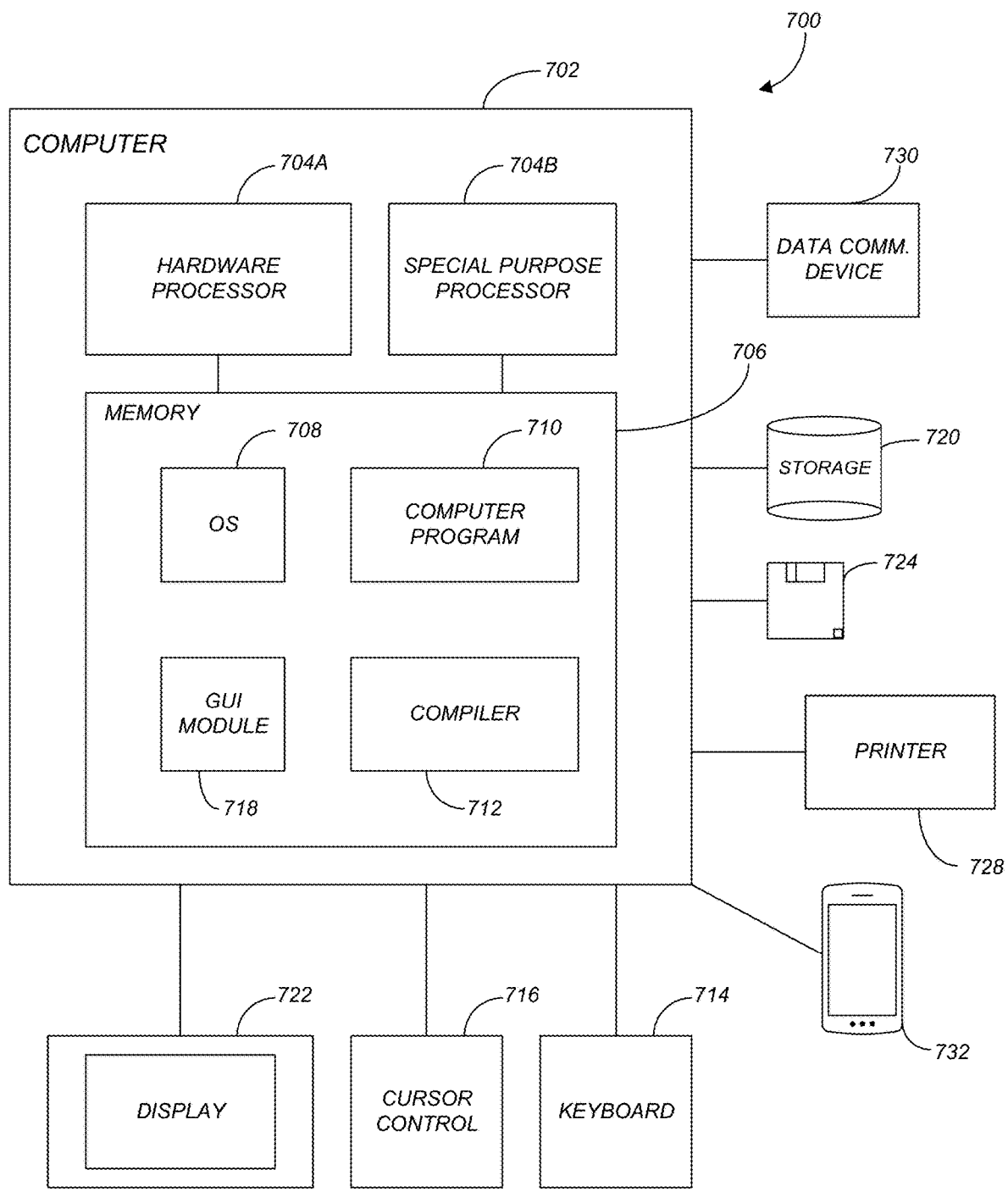
FIG. 7 is an exemplary hardware and software environment used to implement one or more embodiments of the invention.

FIG. 7 is an exemplary hardware and software environment 700 (referred to as a computer-implemented system and/or computer-implemented method) used to implement one or more embodiments of the invention. The hardware and software environment includes a computer 702 and may include peripherals. Computer 702 may be a user/client computer, server computer, or may be a database computer.

The computer 702 comprises a hardware processor 704A and/or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening device 732 (e.g., an MP3 player, IPOD, NOOK, portable digital video player, cellular device, personal digital assistant, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the hardware processor 704A performing instructions defined by the computer program 710 (e.g., in executable binary code) under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a graphical user interface (GUI) module 718. Although the GUI module 718 is depicted as a separate module, the instructions performing the GUI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., IPHONE, *NEXUS* S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as C, C++, Assembly, SQL, PYTHON, PROLOG, MATLAB, RUBY, RAILS, HASKELL, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
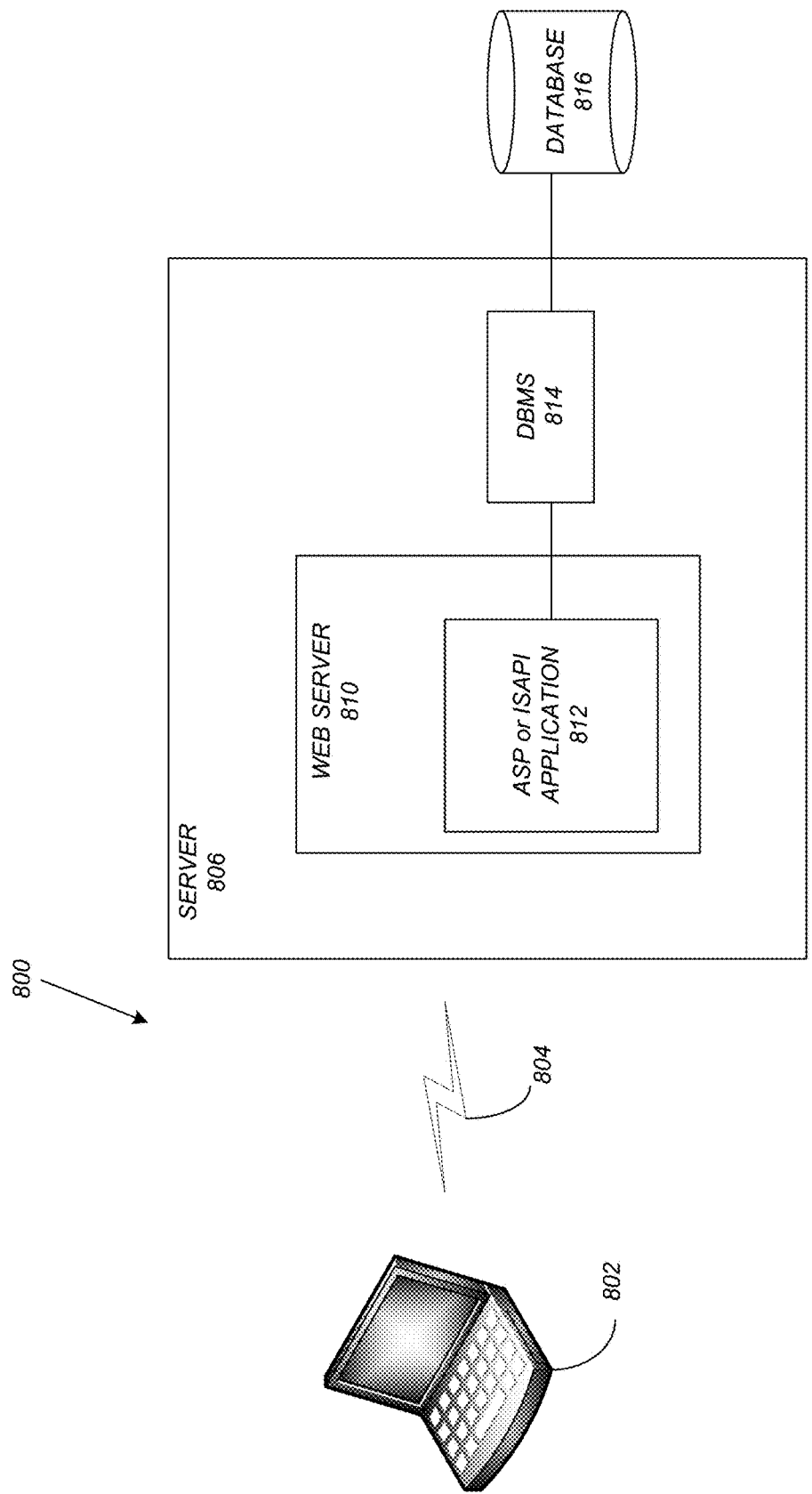
FIG. 8 schematically illustrates a typical distributed/cloud-based computer system utilized in accordance with one or more embodiments of the invention.

FIG. 8 schematically illustrates a typical distributed/cloud-based computer system 800 using a network 804 to connect client computers 802 to server computers 806. A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize ethernet, coaxial cable, wireless communications, radio frequency (RF), etc. to connect and provide the communication between clients 802 and servers 806. Further, in a cloud-based computing system, resources (e.g., storage, processors, applications, memory, infrastructure, etc.) in clients 802 and server computers 806 may be shared by clients 802, server computers 806, and users across one or more networks. Resources may be shared by multiple users and can be dynamically reallocated per demand. In this regard, cloud computing may be referred to as a model for enabling access to a shared pool of configurable computing resources.

Clients 802 may execute a client application or web browser and communicate with server computers 806 executing web servers 810. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 802 may be downloaded from server computer 806 to client computers 802 and installed as a plug-in or ACTIVEX control of a web browser. Accordingly, clients 802 may utilize ACTIVEX components/component object model (COM) or distributed COM (DCOM) components to provide a user interface on a display of client 802. The web server 810 is typically a program such as MICROSOFT'S INTERNET INFORMATION SERVER.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 may be part of, or connected directly to, client 802 instead of communicating/obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S TRANSACTION SERVER (MTS) to access required data stored in database 816 via an interface such as ADO (Active Data Objects), OLE DB (Object Linking and Embedding DataBase), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 802 and 806. Embodiments of the invention are implemented as a software/CAD application on a client 802 or server computer 806. Further, as described above, the client 802 or server computer 806 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[GCC Optimization Summary] Gnu Compiler Collection optimization summary https://gcc.gnu.org/onlinedocs/gcc/Option-Summary.html

[Generic and Gimple] GENERIC and GIMPLE: A New Tree Representation for Entire Functions, Jason Merrill, Red Hat, Inc., GCC Summit 2003, ftp://gcc.gnu.org/pub/gcc/summit/2003/GENERIC %20and %20GIMPLE.pdf

[GNU C Compiler Internals] GNU C Compiler Internals, https://web.archive.org/web/20160410185222/https://www.redhat.com/magazine/002 dec04/features/gcc/

What is claimed is:

1. A computer-implemented method for compiling computer code, comprising:
   (a) obtaining source code;
   (b) pre-processing the source code to generate pure source code, wherein the pure source code comprises definitions required for interpretation of the source code;
   (c) formalizing, in a compiler, the pure source code into assembly language that is processor specific, wherein the formalizing comprises:
      (i) determining a set of two or more optimization routines;
      (ii) randomly selecting multiple selected optimization routines from the set of two or more optimization routines, wherein the random selection improves resistance to software subversion; and
      (iii) applying the multiple selected optimization routines to each segment of the pure source code; and
   (d) outputting an executable binary file based on the formalized pure source code, wherein the executable binary file has an improved resistance to software subversion.

2. The computer-implemented method of claim 1, wherein the randomly selecting comprises:

determining a cost for each of the two or more optimization routines in the set;
determining a subset of two or more optimization routines from the set of the two or more optimization routines, wherein the subset comprises optimization routines whose costs are within a predefined threshold; and
randomly selecting the multiple selected optimization routines from the subset.

3. The computer-implemented method of claim 2, wherein the random selection is based on a variance of all of the costs.

4. The computer-implemented method of claim 1, wherein the formalizing further comprises:
   determining that the multiple selected optimization routines allocate memory;
   scaling up the memory allocation by a predefined percentage; and
   creating an implementation for the multiple selected optimization routines with the scaled up memory allocation.

5. The computer-implemented method of claim 1, wherein the formalizing further comprises:
   determining that the compiling is performed in a multi-processor shared-memory computer wherein multiple processors share a memory cache;
   arbitrarily invalidating cache lines in the memory cache.

6. The computer-implemented method of claim 1, wherein:
   the pre-processing further comprises defining a pre-processor directive that directs different code blocks of the pure source code to be written into different memory blocks;
   the compiling further comprises debugging the source code based on the different memory blocks.

7. The computer-implemented method of claim 1, wherein the formalizing further comprises:
   specifying, via a binary code, an on/off behavior of each of the two or more optimization routines.

8. The computer-implemented method of claim 7, wherein the binary code is set forth in a global variable with each bit of the global variable corresponding to one of the optimization routines.

9. The computer-implemented method of claim 8, further comprising:
   providing the global variable to a hypervisor;
   the hypervisor modifying, via the global variable, an operational parameter of the computer code.

10. The computer-implemented method of claim 9, further comprising:
    the hypervisor observing when the computer code is calling a same piece of memory at a frequency that is suboptimal for a given architecture and does not map to a proper application of the two or more optimization routines;
    wherein the hypervisor modifies the global variable resulting in a different application of the two or more optimization routines.

11. A computer-implemented system for compiling computer code, comprising:
    (a) a computer having a memory;
    (b) a processor executing on the computer; and
    (c) the memory storing a set of instructions, wherein the set of instructions, when executed by the processor cause the processor to perform operations comprising:

(i) obtaining source code;
(ii) pre-processing the source code to generate pure source code, wherein the pure source code comprises definitions required for interpretation of the source code;
(iii) formalizing, in a compiler, the pure source code into assembly language that is processor specific, wherein the formalizing comprises:
  (A) determining a set of two or more optimization routines;
  (B) randomly selecting multiple selected optimization routines from the set of two or more optimization routines, wherein the random selection improves resistance to software subversion; and
  (C) applying the multiple selected optimization routines to each segment of the pure source code; and
(iv) outputting an executable binary file based on the formalized pure source code, wherein the executable binary file has an improved resistance to software subversion.

12. The computer-implemented system of claim 11, wherein the randomly selecting comprises:
  determining a cost for each of the two or more optimization routines in the set;
  determining a subset of two or more optimization routines from the set of the two or more optimization routines, wherein the subset comprises optimization routines whose costs are within a predefined threshold; and
  randomly selecting the multiple selected optimization routines from the subset.

13. The computer-implemented system of claim 12, wherein the random selection is based on a variance of all of the costs.

14. The computer-implemented system of claim 11, wherein the formalizing further comprises:
  determining that the multiple selected optimization routines allocates memory;
  scaling up the memory allocation by a predefined percentage; and
  creating an implementation for the multiple selected optimization routines with the scaled up memory allocation.

15. The computer-implemented system of claim 11, wherein the formalizing further comprises:
  determining that the compiling is performed in a multi-processor shared-memory computer wherein multiple processors share a memory cache;
  arbitrarily invalidating cache lines in the memory cache.

16. The computer-implemented system of claim 11, wherein:
  the pre-processing further comprises defining a pre-processor directive that directs different code blocks of the pure source code to be written into different memory blocks;
  the compiling further comprises debugging the source code based on the different memory blocks.

17. The computer-implemented system of claim 11, wherein the formalizing further comprises:
  specifying, via a binary code, an on/off behavior of each of the two or more optimization routines.

18. The computer-implemented system of claim 17, wherein the binary code is set forth in a global variable with each bit of the global variable corresponding to one of the optimization routines.

19. The computer-implemented system of claim 18, wherein the operations further comprise:
  providing the global variable to a hypervisor;
  the hypervisor modifying, via the global variable, an operational parameter of the computer code.

20. The computer-implemented system of claim 19, wherein the operations further comprise:
  the hypervisor observing when the computer code is calling a same piece of memory at a frequency that is suboptimal for a given architecture and does not map to a proper application of the two or more optimization routines;
  wherein the hypervisor modifies the global variable resulting in a different application of the two or more optimization routines.

* * * * *